(12) United States Patent
Hikmet et al.

(10) Patent No.: US 10,641,438 B2
(45) Date of Patent: May 5, 2020

(54) LIGHTING SYSTEM

(71) Applicant: KONINKLIJKE PHILIPS N.V., Eindhoven (NL)

(72) Inventors: Rifat Ata Mustafa Hikmet, Eindhoven (NL); Ties van Bommel, Aachen (DE); Roman Hohn, Aachen (DE); Josef Andreas Schug, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 20 days.

(21) Appl. No.: 15/510,616

(22) PCT Filed: Sep. 9, 2015

(86) PCT No.: PCT/EP2015/070610
§ 371 (c)(1),
(2) Date: Mar. 10, 2017

(87) PCT Pub. No.: WO2016/041831
PCT Pub. Date: Mar. 24, 2016

(65) Prior Publication Data
US 2017/0254489 A1 Sep. 7, 2017

(30) Foreign Application Priority Data
Sep. 17, 2014 (EP) .................................... 14185192

(51) Int. Cl.
*F21K 9/64* (2016.01)
*F21S 41/16* (2018.01)
(Continued)

(52) U.S. Cl.
CPC ................ *F21K 9/64* (2016.08); *F21S 41/16* (2018.01); *F21V 5/04* (2013.01); *F21V 9/30* (2018.02);
(Continued)

(58) Field of Classification Search
CPC .... G02B 26/105; G03B 21/16; G03B 21/204; F21V 5/04; F21V 9/30; F21V 29/502; F21K 9/64; F21S 41/16
See application file for complete search history.

(56) References Cited

U.S. PATENT DOCUMENTS 7,654,712 B2 * 2/2010 Takeda ...................... F21K 9/00
362/459
8,115,217 B2 * 2/2012 Duong .................... H01L 33/20
257/88
(Continued)

FOREIGN PATENT DOCUMENTS

CN 101939996 A 1/2011
CN 103827746 A 5/2014
(Continued)

OTHER PUBLICATIONS

EPO as ISA, "International Search Report and Written Opinion" dated Nov. 11, 2015 from International Application No. PCT/EP2015/070610, filed Sep. 9, 2015, 13 pages.
(Continued)

*Primary Examiner* — Anh T Mai
*Assistant Examiner* — Arman B Fallahkhair
(74) *Attorney, Agent, or Firm* — Brian D. Ogonowsky; Patent Law Group LLP

(57) ABSTRACT

Proposed is a lighting system comprising: at least one laser adapted to output light; a pixelated luminous screen for emitting light when excited by incident light; and at least one optical component adapted to redirect and distribute light from the at least one laser to the pixelated luminous screen. The pixelated luminous screen comprises: a plurality of luminous pixels arranged adjacent each other with separated side edges, each pixel comprising luminous material; and a heat sink formed from thermally conductive material. The
(Continued)

heat sink is positioned between the plurality of luminous pixels such that it contacts the adjacent side edges of the pixels.

20 Claims, 10 Drawing Sheets

(51) Int. Cl.

| | | |
|---|---|---|
| *F21V 29/502* | (2015.01) | |
| *F21V 9/30* | (2018.01) | |
| *G03B 21/20* | (2006.01) | |
| *G03B 21/16* | (2006.01) | |
| *F21V 5/04* | (2006.01) | |
| *F21Y 115/30* | (2016.01) | |
| *G02B 26/10* | (2006.01) | |

(52) U.S. Cl.
CPC ............ *F21V 29/502* (2015.01); *G03B 21/16* (2013.01); *G03B 21/204* (2013.01); *F21Y 2115/30* (2016.08); *G02B 26/105* (2013.01)

(56) References Cited

U.S. PATENT DOCUMENTS

| | | | | |
|---|---|---|---|---|
| 8,262,257 | B2* | 9/2012 | Deeben | ................. H01L 33/508 |
| | | | | 362/249.02 |
| 8,956,025 | B2* | 2/2015 | Kushimoto | ............ B60Q 1/085 |
| | | | | 362/510 |
| 9,606,348 | B2 | 3/2017 | Cao et al. | |
| 9,890,918 | B2* | 2/2018 | Singer | ....................... F21V 7/22 |
| 2010/0321641 | A1 | 12/2010 | Lubbe | |
| 2011/0157865 | A1* | 6/2011 | Takahashi | ................. F21V 9/16 |
| | | | | 362/84 |
| 2011/0249460 | A1 | 10/2011 | Kushimoto | |
| 2015/0292725 | A1* | 10/2015 | Liu | ......................... F21V 29/86 |
| | | | | 362/249.02 |
| 2015/0345746 | A1 | 12/2015 | Fornasiero et al. | |

FOREIGN PATENT DOCUMENTS

| | | |
|---|---|---|
| DE | 102012025396 A1 | 6/2014 |
| DE | 102013102205 A1 | 9/2014 |
| EP | 2196724 A2 | 6/2010 |
| WO | 2009136351 A1 | 11/2009 |
| WO | 2010067291 A1 | 6/2010 |
| WO | 2012130581 A1 | 10/2012 |
| WO | 2013131904 A1 | 9/2013 |
| WO | 2013144053 A1 | 10/2013 |
| WO | 2014095906 | 6/2014 |

OTHER PUBLICATIONS

Extended European Search Report dated Mar. 16, 2015, European Application No. 14185192.3, 9 pages.
EP Communication dated Dec. 4, 2018, European Patent Application No. 15760457.0, 5 pages.
CN Office Action dated Feb. 28, 2019, China Patent Application No. 201580050393.X, 12 pages.

* cited by examiner

LIGHTING SYSTEM

CROSS-REFERENCE TO RELATED APPLICATIONS

The present application is a § 371 application of International Application No. PCT/EP2015/070610 filed on Sep. 9, 2015 and entitled "LIGHTING SYSTEM", which claims the benefit of European Patent Application No. 14185192.3 filed on Sep. 17, 2014. International Application No. PCT/EP2015/070610 and European Patent Application No. 14185192.3 are incorporated herein.

FIELD OF THE INVENTION

This invention relates to a lighting system, and more particularly to a lighting system comprising a laser and a luminous screen for emitting light when excited by incident light.

BACKGROUND OF THE INVENTION

Lasers are known to be energy efficient and small light sources that have a small/low etendue (i.e. the product of emitting area with solid angle in which the light is emitted). This implies that these laser light sources emit light from a relatively small area into a limited angular range.

Such lasers may therefore be beneficial for applications where a bright light source is needed. Typical example applications include projection systems, automotive lighting, camera flashlights, and spot lights. For these examples, it may be desirable to provide a light beam that is inhomogeneous (i.e. having a luminance that varies with position in the light beam). This is typically achieved by superimposing several images of the light source (or several light beams). Images or light beams with different magnification or luminance are overlaid so as to produce an overall output light beam having a required shape and/or luminance variation. However, such known approaches typically fail to provide an output light beam having a suitable shape and/or luminance variation.

SUMMARY OF THE INVENTION

The invention is defined by the claims.

According to an aspect of the invention there is provided a lighting system comprising: at least one laser adapted to output light; a pixelated luminous screen for emitting light when excited by incident light; and at least one optical component adapted to redirect and distribute light from the at least one laser to the pixelated luminous screen, wherein the pixelated luminous screen comprises: a plurality of luminous pixels arranged adjacent each other with separated side edges, each pixel comprising luminous material; and a heat sink formed from thermally conductive material, the heat sink being positioned between the plurality of luminous pixels such that it contacts the adjacent side edges of the pixels.

Embodiments employ the concept of integrating a heat sink into a luminous screen for emitting light when excited by incident laser light. The heat sink can extend into the luminous screen between the pixels so that it contacts the side of the pixels and thus has a large surface area in contact with the pixels for dissipating heat. Put another way, the heat sink can be formed between the pixels so as to cover the sides and back of each pixel for improved heat management.

In other words, there is proposed a concept for pixilating a luminous screen in order to obtain high resolution (in both reflective and transmissive modes), while also spreading/dissipating heat away from the luminescent convertor (e.g. the luminous screen) so that it can be illuminated by high intensity light (e.g. high power laser light).

Embodiments may be used to generate a light beam that can have various shapes and/or characteristics (such as luminance and colour, for example). Embodiments may therefore be employed to create inhomogeneous light beams from a laser light source. Such inhomogeneous light beams may be of particular use in automotive lighting, projection systems, camera flashlights, and spot lights, for example.

Luminous material may be a 'color conversion fill', such as a luminescent material. Examples may include a ceramic phosphor, a phosphor platelet, or a known luminescent material referred to as a "lumiramic" material. This may further help to maintain the etendue of the emission area and/or change the colour of the emitted light.

Each of the plurality of luminous pixels may comprise: a front light output surface adapted to output light; and a rear surface opposite the front light output surface. The heat sink may at least partially cover the rear surface of each of the plurality of luminous pixels. Covering the sides and rear of the pixels with a heat sink may provide for improved heat conduction. Heat sinking elements around the luminous pixels need to have relatively high heat conductivity for transporting the heat away from the pixels and avoid the temperature raise.

The heat sink may comprise at least one aperture, the at least one aperture being adapted to enable light to pass therethrough and be incident on the rear surface each of the plurality of luminous pixels. In such embodiments, laser light may enter the pixels via their rear surface (e.g. via holes formed in the heat sink covering the back of the pixels).

In an embodiment, the front light output surface of the plurality of luminous pixels may be non-planar. In other words, the front light output surface may vary in the vertical direction for improved light extraction and/or collimation).

Side edges of the plurality of luminous pixels may be tapered so that the area of the front light output surface of a luminous pixel is greater than the area of its rear surface. Such tapering of the sides of the pixels may help to increase light extraction.

Embodiments may further comprise a (at least partially) transparent layer at least partially covering the front light output surface of each of the plurality of luminous pixels. The (at least partially) transparent layer may comprise an array of lenticular structures. Also, in some embodiments, the (at least partially) transparent layer may be formed from a material having a thermal conductivity higher than 2 W·m−1·K−1, preferably higher than 10 W·m−1·K−1, more preferably more than 40 W·m−1·K−1, and even more preferably more than 100 W·m−1·K−1. Adding a (at least partially) transparent coating layer on the front light output surface may enhance properties such as reflectivity, light emission, heat dissipation, and/or emitted wavelength, for example.

Each of the plurality of luminous pixels may comprise the same luminous material. The plurality of luminous pixels may thus be formed from the same sheet/layer of luminous material, for example, by etching channels in the single sheet/layer of luminous material.

In an embodiment, at least one of the plurality of luminous pixels may further comprise an at least partially transparent non-luminous material.

Also, in an embodiment, at least one of the plurality of luminous pixels may further comprise a reflective material.

The plurality of luminous pixels may be of different shape and/or size. Various configurations of the pixels may therefore be employed to provide different illumination patterns, shapes and/or sizes.

Embodiments may comprise: first and second lasers adapted to output first and second laser light, respectively; and a plurality of optical components adapted to distribute the first and second laser light to different sets of luminous pixels of the pixelated luminous screen. Multiple lasers and optical components may thus be employed to cater for different concepts of illuminating the pixels.

Some or all of the pixels may comprise (e.g. be filled with) different luminous materials. As an example, certain pixels of the pixelated luminous screen may be filled with a first type of phosphor (e.g. converting blue to white) and others may be filled with another type of phosphor (e.g. converting blue to red).

The thermal conductivity of the thermally conductive material may be higher than 10 W·m−1·K−1, more preferably more than 40 W·m−1·K−1, and even more preferably more than 100 W·m−1·K−1. Use of thermally conductive material with a relatively high thermal conductivity may enhance heat dissipation, wherein higher values of thermal conductivity may provide higher levels of heat dissipation for example.

Embodiments may be employed in the field of automotive lighting and other fields/applications where high-luminance lighting is desirable. Thus, according to an aspect of the invention, there may be provided an automotive light comprising a lighting system according to an embodiment.

According to another aspect of the invention, there may be provided a projector light comprising a lighting system according to an embodiment.

According to yet another aspect of the invention, there is provided a method of manufacturing a pixelated luminous screen for a lighting system having at least one laser adapted to output light and at least one optical component adapted to redirect and distribute light from the at least one laser to the pixelated luminous screen, the method comprising: providing a plurality of luminous pixels arranged adjacent each other with separated side edges; and forming a heat sink from thermally conductive material such that heat sink is positioned between the plurality of luminous pixels and contacts the adjacent side edges of the pixels.

The step of providing a plurality of luminous pixels may comprise: providing a layer of luminous material; and forming a plurality of channels in the upper surface of the layer of luminous material, the channels defining the side edges of the plurality of luminous pixels.

Embodiments may employ a heat sink formed from a material with relatively high heat conductivity. Also, embodiments may further comprise, after forming the heat sink, removing a portion of the layer of luminous material such that the plurality of channels extend entirely through the layer of luminous material to wholly separate adjacent luminous pixels.

Embodiments may therefore employ a concept of forming the luminous pixels in a single layer of luminous material and then forming the heat sink in the channels between the pixels.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting system comprising a pixelated luminous screen offering improved heat management and a method for manufacturing the same. Embodiments may be of particular relevance to applications that require light of high or increased luminance from a relatively small and/or efficient light source and/or applications that require one or more inhomogeneous light beams from a high power semiconductor light source such as a laser.

Embodiments employ the concept of integrating a heat sink into a luminous screen for emitting light when excited by incident laser light. The heat sink can extend into the luminous screen between the pixels so that it separates and/or defines the pixels whilst providing a large surface area for transporting heat away from the luminescent pixels. For example, by providing a heat sink between the pixels so that it covers the sides and back of each pixel, embodiments may provide for improved heat management.

The term vertical, as used herein, means substantially orthogonal to the surface of a substrate. The term lateral, as used herein, means substantially parallel to the surface of a substrate. Also, terms describing positioning or location (such as above, below, top, bottom, etc.) are to be construed in conjunction with the orientation of the structures illustrated in the diagrams.

The diagrams are purely schematic and it should therefore be understood that the dimensions of features are not drawn to scale. Accordingly, the illustrated thickness of any of the layers should not be taken as limiting. For example, a first layer drawn as being thicker than a second layer may, in practice, be thinner than the second layer.

Figure 1:
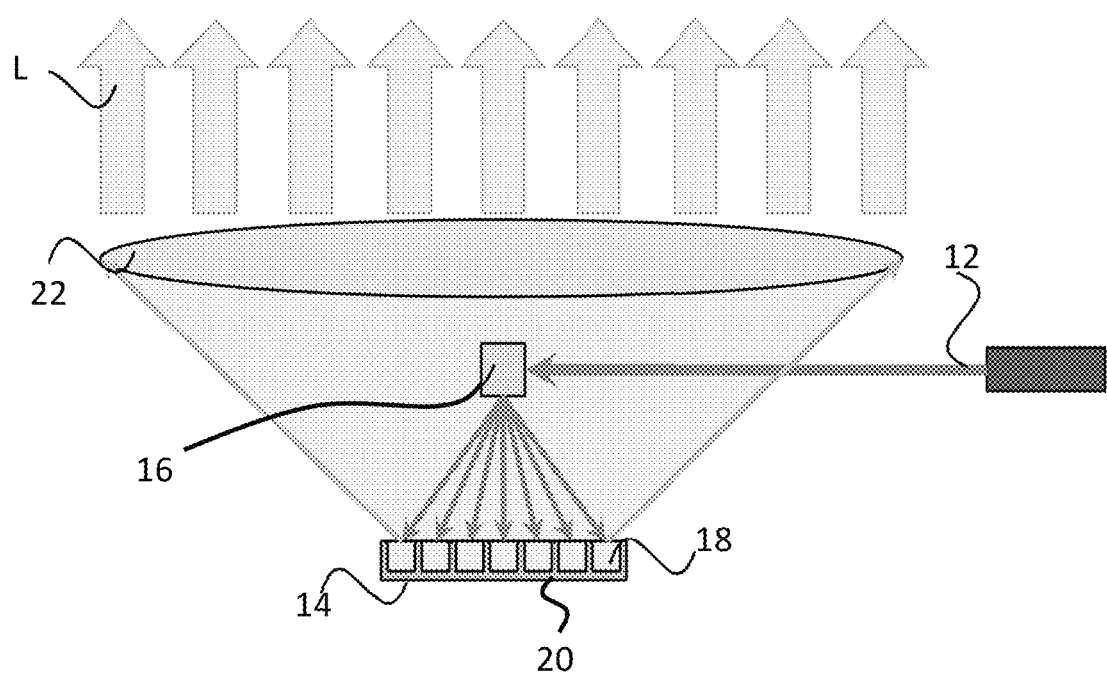
FIG. 1 is a simplified drawing of a lighting system.

Referring to FIG. 1, there is depicted a lighting system 10. The lighting system 10 comprises a laser 12 adapted to output light, a pixelated luminous screen 14 for emitting light when excited by incident light, and an optical component 16 adapted to redirect and distribute light from the laser 12 to the pixelated luminous screen 14.

The pixelated luminous screen 14 comprises a plurality of pixels 18 arranged adjacent each other with separated side edges. The luminous pixels comprise light converting material which converts the laser light to longer wavelengths, such as luminescent material. Suitable materials luminescent materials used in the invention include inorganic phosphors, such as doped YAG, LuAG, organic phosphors, organic fluorescent dyes and quantum dots which are highly suitable for the purpose of the present invention.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS2) and/or silver indium sulfide (AgInS2) can also be used. Quantum dots show very narrow emission band and thus they show saturated colors. Furthermore, the emission color can easily be tuned by adapting the size of the quantum dots. Any type of quantum dot known in the art may be used in the present invention. However, it may be preferred, for reasons of environmental safety and concern, to use cadmium-free quantum dots or at least quantum dots having very low cadmium content.

Organic fluorescent dyes may be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The light converting material may also comprise an inorganic phosphor. Examples of inorganic phosphor materials include, but are not limited to, cerium (Ce) doped YAG (Y3Al5O12) or LuAG (Lu3Al5O12). Ce doped YAG emits yellowish light, whereas Ce doped LuAG emits yellow-greenish light. Examples of other inorganic phosphors materials which emit red light may include, but are not limited to ECAS and BSSN; ECAS being Ca1-xAlSiN3:Eux wherein $0<x\le1$, preferably $0<x\le0.2$; and BSSN being Ba2-x-zMxSi5-yAlyN8-yOy:Euz wherein M represents Sr or Ca, $0\le x\le1$, $0\le y\le4$, and $0.0005\le z\le0.05$, and preferably $0\le x\le0.2$.

Further, the light converting material may be essentially made of material selected from the group comprising (M<I>1-x-yM<II>xM<III>y)3(M<IV>1-zM<V>z)5O12- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0\le x\le1$, $0\le y\le0.1$, $0\le z\le1$, (M<I>1-x-yM<II>x,M<III>y)2O3- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0\le x\le1$, $0\le y\le0.1$, (M<I>1-x-yM<II>xM<III>y)S1-zSez- where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0\le x\le0.01$, $0\le y\le0.05$, $0\le z\le1$, (M<I>1-x-yM<II>xM<III>y)O— where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0\le x\le0.1$, $0\le y\le0.1$, (M<I>2-xM<II>xM<III>2)O7- where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<=x<=1$, (M<I>1-xM<II>xM<III>1-yM<IV>y)O3- where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0\le x\le0.1$, $0\le y\le0.1$, or mixtures thereof.

Particularly suitable luminescent materials, however, may be Ce doped Yttrium aluminum garnet (YAG, $Y_3Al_5O_{12}$) and Lutetium-Aluminum-Garnet (LuAG).

Each of the two or more luminescent light guides comprises a different central emission wavelength within a blue color-range or within a green color-range or within a red color-range. The blue color-range is defined between 380 nanometers and 495 nanometers, the green color-range is defined between 495 nanometers and 590 nanometers, and the red color-range is defined between 590 nanometers and 800 nanometers.

Thermal conductivity of the phosphor ceramic is preferentially higher than 2 more preferentially more than 6 and most preferentially more than 20 $W \cdot m^{-1} \cdot K^{-1}$.

Each pixel has an upper front surface through which light can be input and output, and a lower surface opposite the upper surface. The upper surface will be referred to as the "front" surface, and the lower surface will be referred to as the "rear" surface.

The pixelated luminous screen 14 also comprises a heat sink 20 formed from thermally conductive material, such as metal or highly heat conducting ceramics such aluminium oxide or Boron nitride for example. The heat sink 20 is shaped and positioned such that it contacts and covers the rear and side surfaces of the pixels 18. In particular, the heat sink 20 comprises a plurality of upwardly projecting flanges that extend between the luminous pixels. In this way, the heat sink 20 contacts adjacent side edges of the pixels 18.

In this embodiment, the heat sink 20 completely covers the rear surface of each pixel 18. However, it will be appreciated that, in other embodiments, the heat sink 20 may be adapted to cover only a portion the rear surface of each pixel 18. Also, a larger heat sink may be placed on the back surface of 20 for further cooling the pixelated arrangement for example.

The optical component 16 in this embodiment comprises a light reflector 16 that reflects light from the laser towards the pixelated luminous screen 14. Here, the light reflector 16 comprises a mirror that is movable by drive means (not shown). The drive means are adapted to pivot the mirror about one or more axes in a reciprocating fashion so that the mirror can cause the light to scan across the pixels 18 of the pixelated luminous screen 14. Other optical components 16 may be used in alternative embodiments, such as a lens, a MEMs mirror, DMD, LCD, optical fibre, or a refractor, etc.

Light from the laser 12 is redirected and distribute to the pixelated luminous screen 14 by the optical component 16. The light from the laser is thus incident on the front surface of the pixels 18 and enter the pixels 18, wherein it excites the luminous material of the pixels and causes the pixels 18 to emit light from their front surface. The pixels 18 thus emit light in a generally upwardly extending direction from their front surface. The emitted light then passes through an optical arrangement 22, such as lens, which creates an image (as depicted by the arrows labelled "L").

Thus, it will be appreciated that, in the embodiment of FIG. 1, the heat sink 20 also acts a reflector which redirects light towards the front (light input/output) surface of the pixels 18. Each pixel 18 may therefore be thought of as a "mix-box" in which light is reflected/recycled until it escapes from the front (light input/output) surface.

By projecting or scanning light from the laser 12 onto the pixelated luminous screen 14 (via the optical component), light can then be emitted from the pixelated luminous screen 14 and projected by an optical arrangement to create a certain image.

Figure 2:
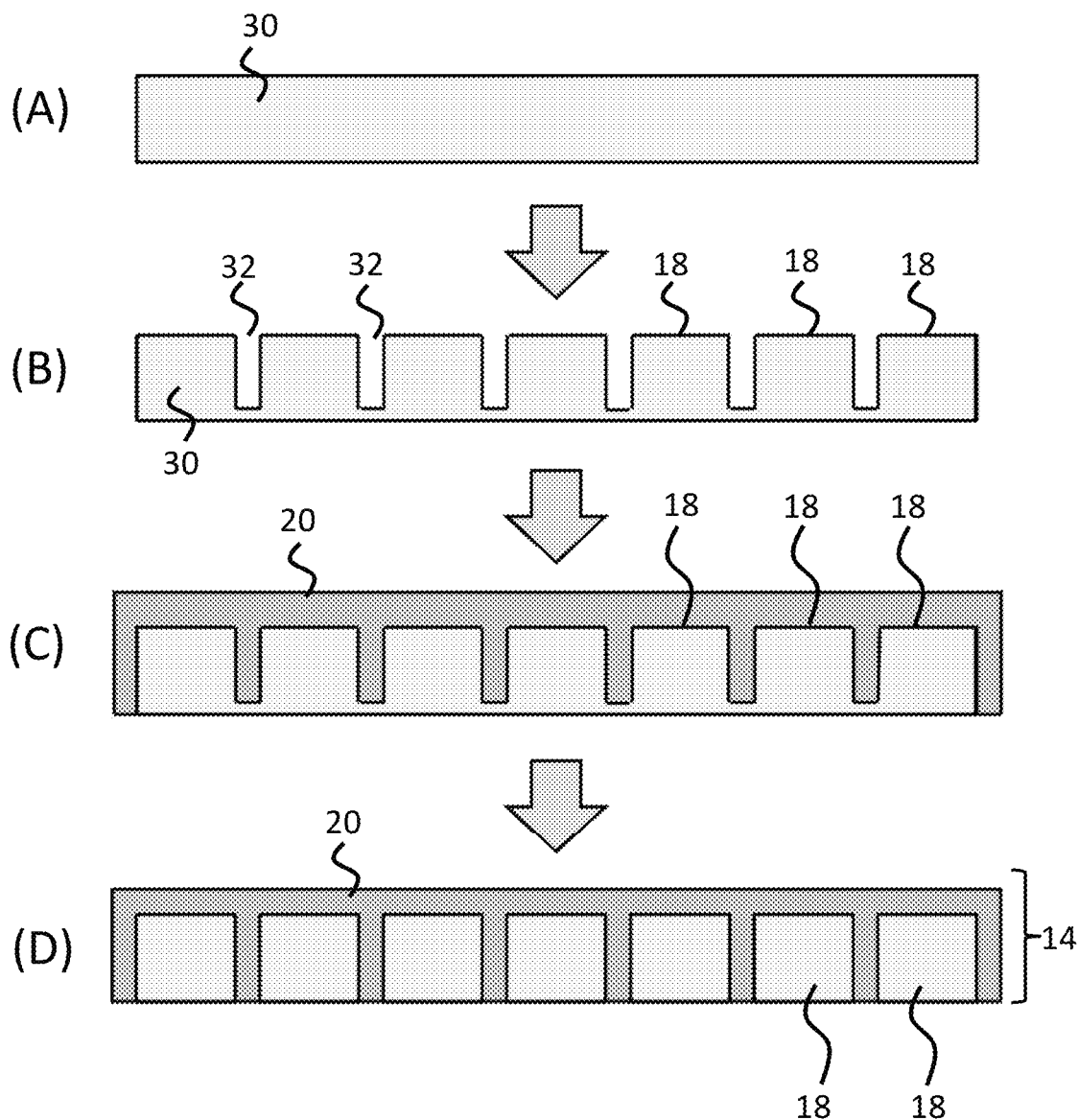
FIG. 2 illustrates steps of manufacturing a pixelated luminous screen for a lighting system according to an embodiment.

FIG. 2 illustrates steps of manufacturing a pixelated luminous screen for a lighting system, such as that shown in FIG. 1.

As shown in FIG. 2A, a single layer 30 of luminous material is provided. By way of example, this single ceramic plate 30 of luminous material may comprise a phosphor platelet known as a lumiramic.

Channels 32 are then formed (e.g. etched) in the upwardly facing surface of the layer 30 of luminous material, as shown in FIG. 2B. The channels 32 define the side edges of a plurality of luminous pixels 18. Thus, as a result of the step depicted in FIG. 2B, there is provided a plurality of luminous pixels 18 arranged adjacent each other with separated side edges.

As shown in FIG. 2C, a thermally conductive material is deposited to cover the upwardly facing side of the layer 30 and fill the channels 32. Consequently, the deposited thermally conductive material forms a heat sink 20 that contacts the side edges of the pixels 18.

Finally, as depicted in FIG. 2D, a lower portion of the layer 30 of luminous material is removed (e.g. etched) such that the channels 32 extend entirely through the layer 30 of luminous material to wholly separate adjacent luminous pixels 18. There is therefore provided a pixelated luminous screen 14 comprising: a plurality of luminous pixels 18 arranged adjacent each other with separated side edges; and a heat sink 20 that is positioned between the plurality of luminous pixels 18 such that it contacts the adjacent side edges of the pixels 18.

Figure 3:
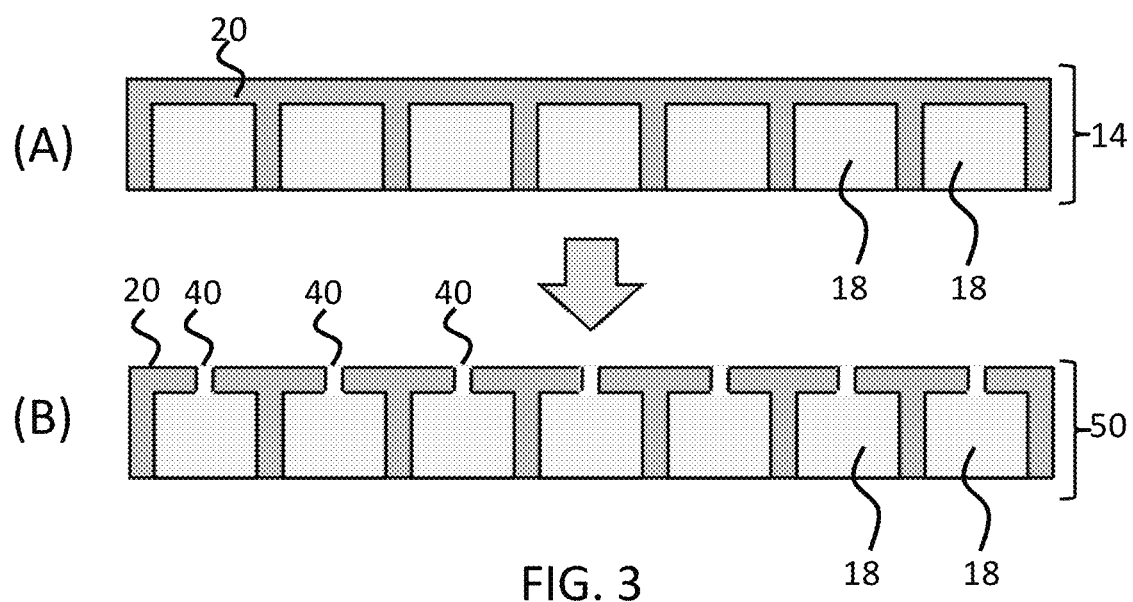
FIG. 3 illustrates an additional step for manufacturing a pixelated luminous screen according to another embodiment.

Turning now to FIG. 3, there is shown an additional step for manufacturing a pixelated luminous screen according to another embodiment. Firstly, as shown in FIG. 3A, there is provided a pixelated luminous screen 14 according to an embodiment. More specifically, in this example, the pixelated luminous screen 14 is the same as that depicted in FIG. 2D, and was thus manufactured according to a proposed embodiment.

Then, as shown in FIG. 3B, a plurality of apertures 40 are formed in the heat sink 20 such the position of each aperture 40 corresponds with a respective pixel positioned below. The apertures 40 are therefore adapted to enable light to pass therethrough and be incident on the upwardly facing surface of each of the plurality of luminous pixels 18.

Figure 4:
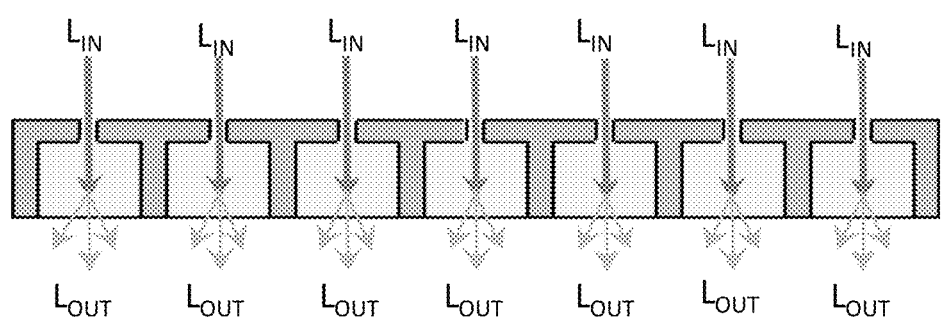
FIG. 4 illustrates a use of the pixelated luminous screen depicted in FIG. 3B.

As illustrated in FIG. 4, the pixelated luminous screen 50 manufactured as shown in FIG. 3 can be considered to have (i) a rear light input surface 51 through which light can be input to the luminous pixels 18 via the apertures 40 (as depicted by the arrows labelled $L_{IN}$), and (ii) a front light output surface 52 through which light can be output from the luminous pixels 18 (as depicted by the arrows labelled LOUT).

Although embodiments have so far been described as having pixels which comprise a single luminous material, it is to be understood that, in alternative embodiments, the pixels may comprise additional features and/or components. By way of example, FIGS. 5-7 depict alternative embodiments.

Figure 5:
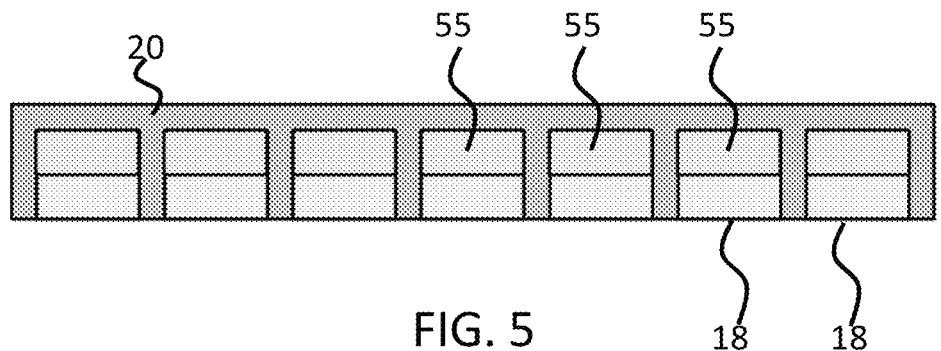
FIG. 5 is a simplified drawing of a pixelated luminous screen according to an embodiment.
Figure 6:
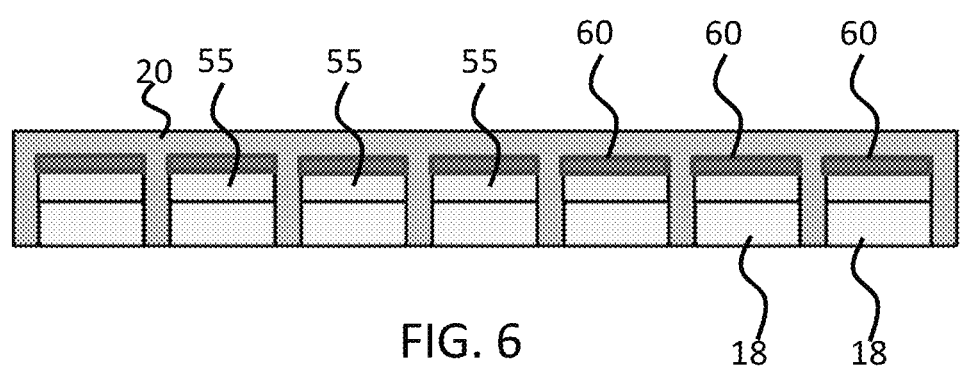
FIG. 6 is a simplified drawing of a pixelated luminous screen according to another embodiment.

FIG. 5 is a simplified drawing of a pixelated luminous screen according to an embodiment, wherein each of the luminous pixels 18 further comprises a transparent non-luminous material 55. Such transparent non-luminous material 55 may comprise, for example, an optical enhancement material which alters optical properties of transmitted or reflected light. Also, as shown in FIG. 6, each of the luminous pixels 18 can further comprises a dichroic material 60 which transmits blue light from a laser and reflects yellow light emitted from the luminous material. The configuration shown in FIG. 6 comprising dichroic layer may be particularly relevant to embodiments where holes are present in the heat sink (as in FIG. 3 for example) where, in such a case, laser light can be transmitted by the dichroic layer and the converted light is not allowed to escape from the back.

Figure 7:
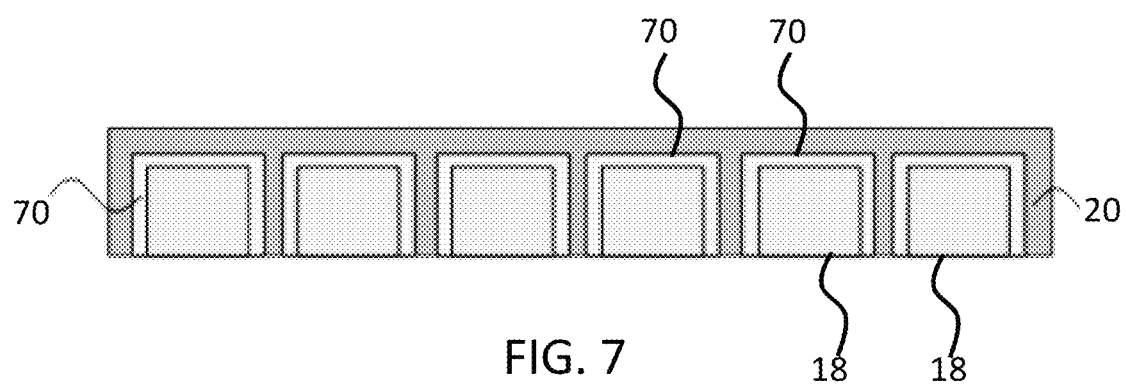
FIG. 7 is a simplified drawing of a pixelated luminous screen according to yet another embodiment.

FIG. 7 is a simplified drawing of a pixelated luminous screen according to an embodiment, wherein each of the luminous pixels 18 further comprises a highly-reflective material 70.

Such additional materials may be included in the luminous pixels 18 by being deposited prior to the heat sink 20 being deposited. For example, one or more additional steps (for depositing additional material) may be included between the steps depicted by FIGS. 2B-2C.

Although the embodiments of FIGS. 5-7 have been described without any apertures in the heat sink for enabling light to pass therethrough, it is to be understood that, in alternative embodiments, the heat sinks of FIGS. 5-7 may comprise at least one aperture adapted to enable light to pass therethrough and be incident on the rear surface of one or more of the plurality of luminous pixels.

Figure 8:
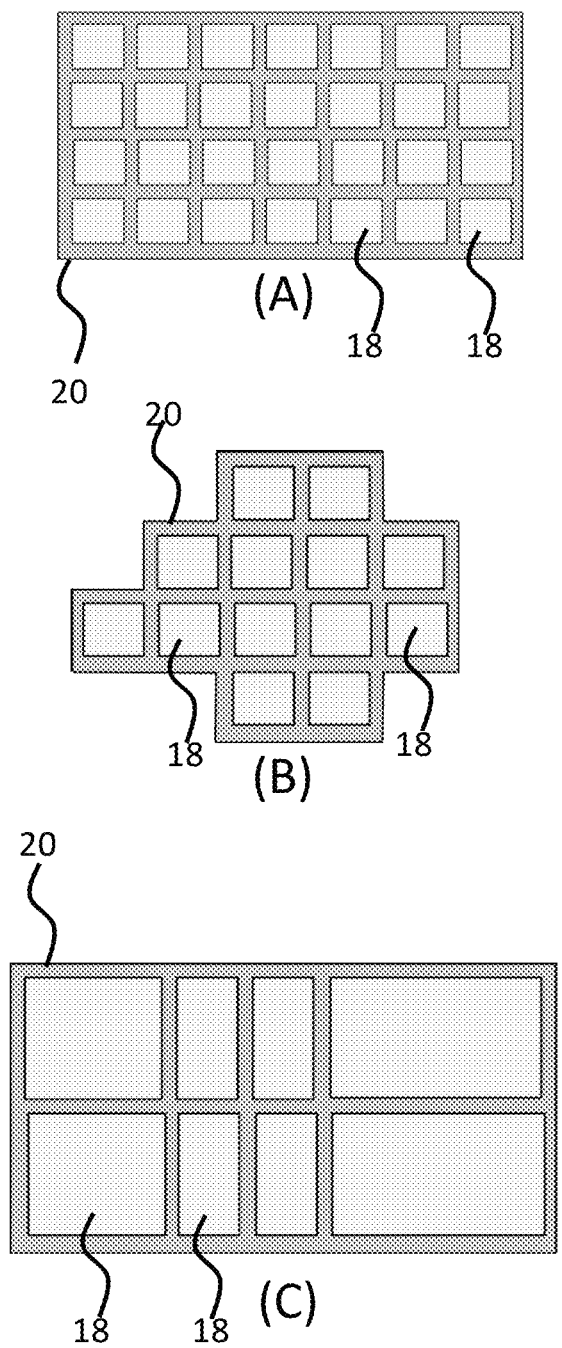
FIG. 8 depicts pixelated luminous screens according to various embodiments.
Figure 9:
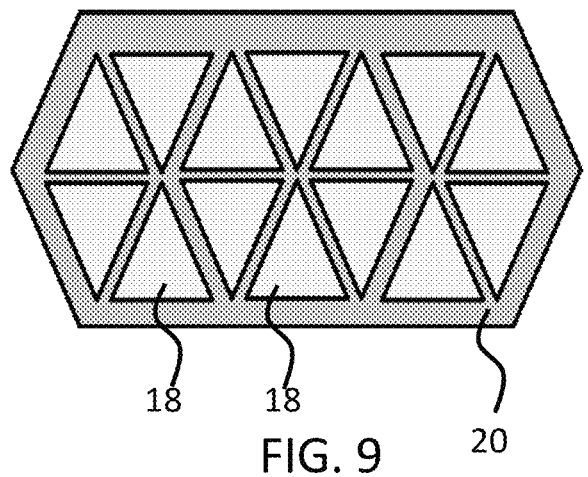
FIG. 9 is a simplified plan view of a pixelated luminous screen according to yet another embodiment.

Furthermore, as illustrated by the various arrangements of FIGS. 8-9, pixelated luminous screens according to the proposed concept may comprise different arrangements of luminous pixels. The luminous pixels may be arranged in regular or non-regular arrays and may also be of differing shape and/or size. The pattern and/or size of the luminous pixels 18 may thus be chosen to create output illumination/light beams according to requirements.

Figure 10:
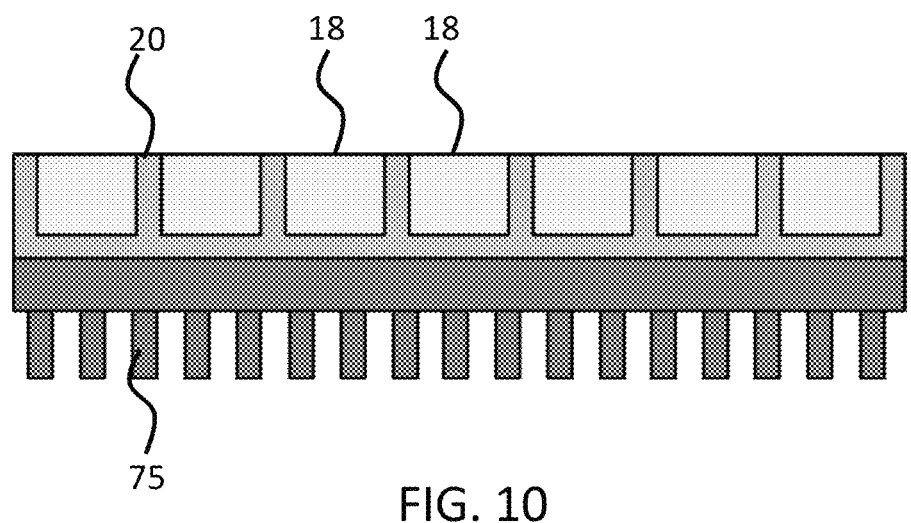
FIG. 10 is a simplified drawing of a pixelated luminous screen according to yet another embodiment.

Referring now to FIG. 10, there is shown a pixelated luminous screen according to yet another embodiment, wherein the pixelated luminous screen further comprises an additional heat sink 75 in contact with heat sink 20 that contact the luminous pixels 18. Such inclusion of an additional heat sink may further improve heat dissipation/management.

Figure 11:
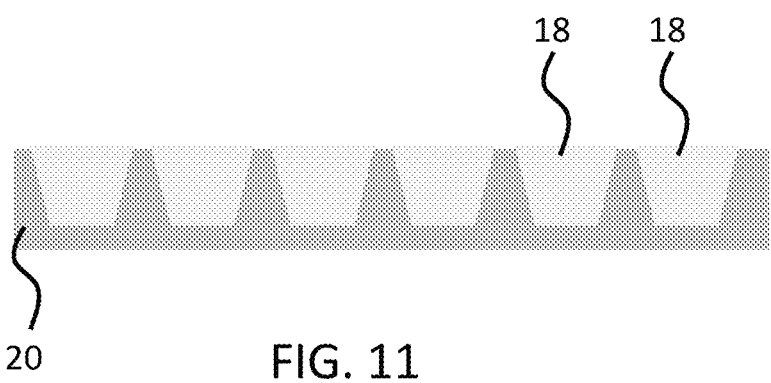
FIG. 11 is a simplified drawing of a pixelated luminous screen according to yet another embodiment.

Turning to FIG. 11, there is shown a pixelated luminous screen according to yet another embodiment, wherein side edges of the plurality of luminous pixels 18 are tapered so that the area of the front light output surface of a luminous pixel 18 is greater than the area of its rear surface. Tapering of the sides of the pixels 18 may help to increase light extraction from the pixel 18.

Figure 12:
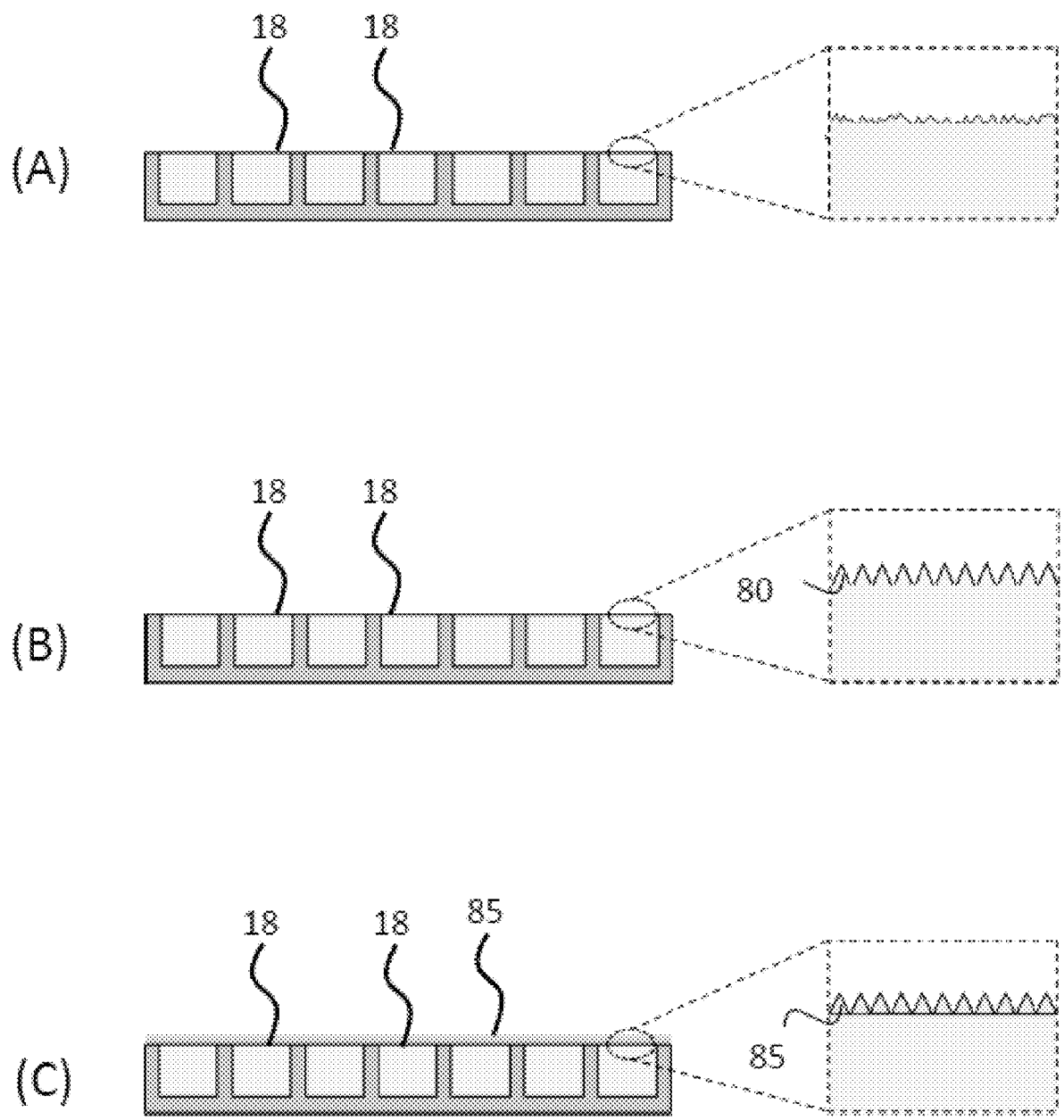
FIG. 12 depicts pixelated luminous screens according to various embodiments.

Although embodiments have so far been described/illustrated in a way that implies the luminous pixels 18 have a substantially planar (front) light output surface, it is to be understood that, in alternative embodiments, the luminous pixels 18 may instead have a non-planar (front) light output surface. By way of example, FIG. 12 depicts various embodiments wherein the front light output surface of the plurality of luminous pixels is non-planar.

In FIG. 12A, the front light output surface of the plurality of luminous pixels is roughened to increase light extraction properties, whereas, in FIG. 12B the front light output surface of the plurality of luminous pixels is formed to have a repeating pattern of upwardly extending structures 80 for improved light extraction and collimation properties. In FIG. 12C, the front light output surface of the plurality of luminous pixels is provided with an additional layer of upwardly extending optical structures 85. However, unlike the embodiment of FIG. 12B (wherein the upwardly extending structures are formed in the luminous material of the luminous pixels), the upwardly extending structures of embodiment of FIG. 12C are formed as an additional layer 85 on top of the luminous pixels.

Embodiment may thus comprise a refractive structure having features, such as e.g. protrusions and recesses forming a wave shaped structure. The typical size of the features of the refractive structure may be in the range of 5 µm to 500 µm. The shape of the features may be e.g. hemispherical (lenses), prismatic, sinusoidal or random (e.g. sand-blasted). By choosing the appropriate shape, the amount of light coupled into the light guide can be tuned. Such refractive structures may be made by mechanical means such as by chiseling, sand blasting or the like. Alternatively, the refractive structures may be made by replication in an appropriate material, such as e.g. polymer or sol-gel material.

Figure 13:
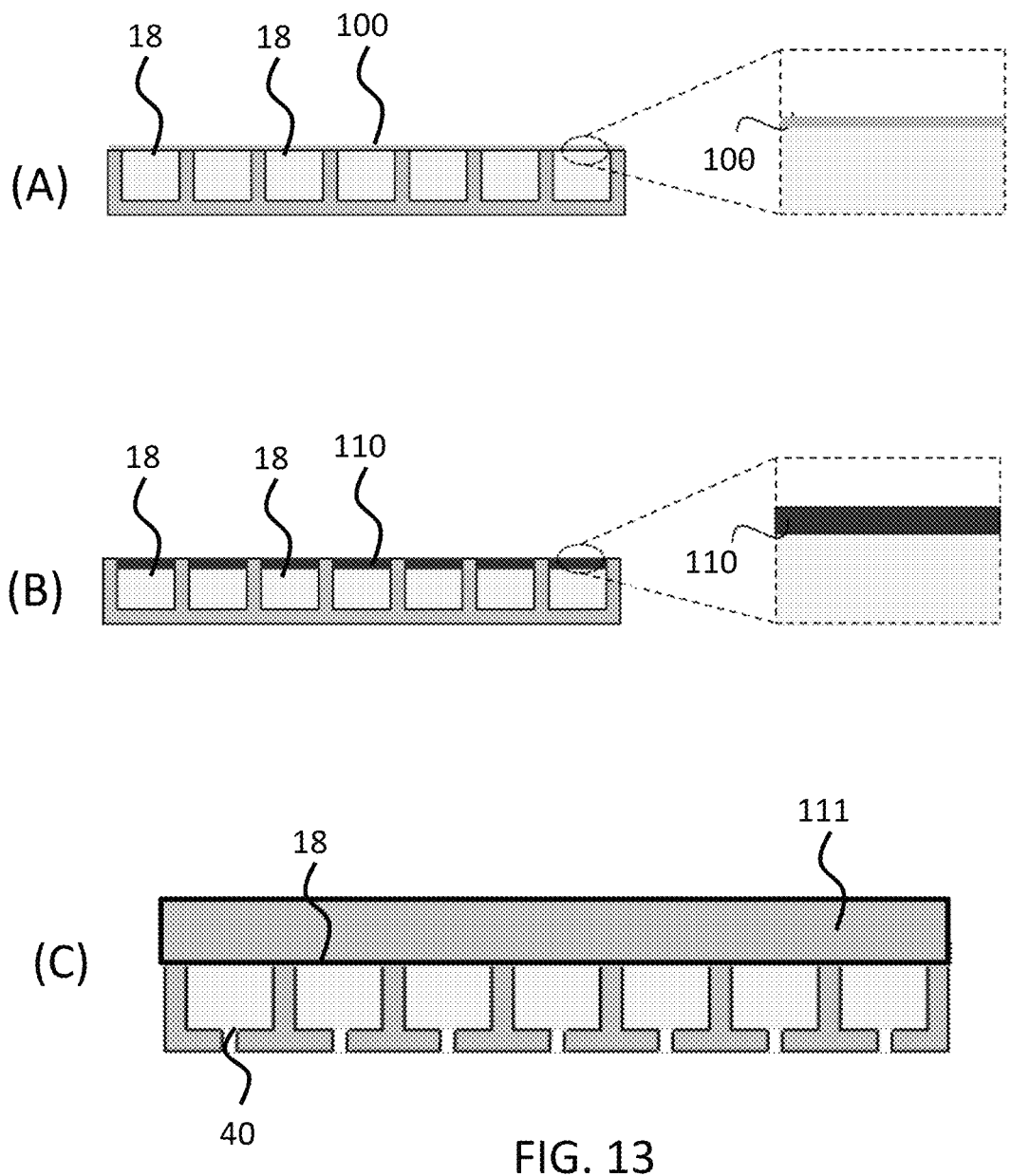
FIG. 13 depicts pixelated luminous screens according to three different embodiments.

Thus, from the example shown in FIG. 12C, it is to be understood that embodiments may comprises one or more additional coating layers covering (at least part of) the light output surface of the plurality of luminous pixels. By way of example, FIG. 13A depicts an embodiment wherein an anti-reflection coating 100 is provided to cover the upwardly facing light output surface of the plurality of luminous pixels 18. By way of further example, FIG. 13B depicts an embodiment wherein a phosphor coating 110 is provided to cover the upwardly facing light output surface of the plurality of luminous pixels 18. The phosphor coating 110 is for adapting the spectrum of the emitted light according to requirements. By way of yet another example, FIG. 13C depicts an embodiment wherein a transparent layer 11 formed from highly thermally conductive material is provided to cover the upwardly facing light output surface of the plurality of luminous pixels 18.

Although such additional coatings have been shown as being used in isolation, it is to be understood that alternative embodiments may employ combinations of multiple coatings.

Although embodiments of FIGS. 10-13 have been described without any apertures in the heat sink for enabling light to pass therethrough, it is to be understood that, in alternative embodiments, the heat sinks of FIGS. 10-13 may comprise at least one aperture adapted to enable light to pass therethrough and be incident on the rear surface of one or more of the plurality of luminous pixels.

Figure 14:
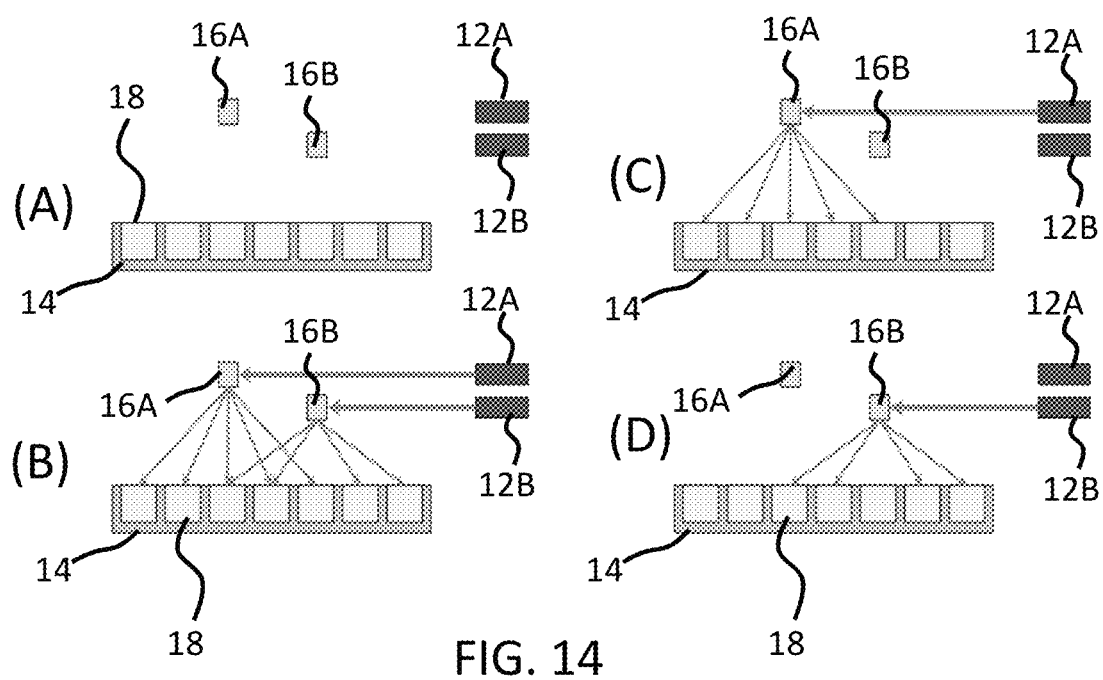
FIG. 14 depicts a lighting system according to an embodiment in various states of use.

Although the embodiment of FIG. 1 has been described as having a single laser and a single optical component, it is to be understood that, in alternative embodiments, more than one laser and/or more than one optical component may be employed. By way of example, FIG. 14 depicts a lighting system according to an embodiment in various states of use, wherein the lighting system comprises first 12A and second 12B lasers and first 16A and second 16B optical components.

The first optical component 16A is adapted to redirect and distribute light from the first laser 12A to luminous pixels 18 of the pixelated luminous screen 14, and the second optical component 16B is adapted to redirect and distribute light from the second laser 12B to luminous pixels 18 of the pixelated luminous screen 14.

FIG. 14A depicts the embodiment in an "OFF" state wherein neither of the first 12A and second 12B lasers is emitting light.

FIG. 14A depicts the embodiment in a "BOTH ON" state wherein both of the first 12A and second 12B lasers are emitting light. In this state, the first optical component 16A redirects and distributes the light from the first laser 12A to a first set luminous pixels 18 of the pixelated luminous screen 14, and the second optical component 16B redirects and distributes light from the second laser 12B to a second, different set of luminous pixels 18 of the pixelated luminous screen 14.

FIG. 14C depicts the embodiment in an "FIRST SINGLE ON" state wherein only the first laser 12A is emitting light, which is then redirected and distributed by the first optical component 16 A to a first set of luminous pixels 18 of the pixelated luminous screen 14.

Finally, FIG. 14D depicts the embodiment in an "SECOND SINGLE ON" state wherein only the second laser 12B is emitting light, which is then redirected and distributed by the second optical component 16B to a second set of luminous pixels 18 of the pixelated luminous screen 14.

The embodiment of FIG. 14 therefore comprises a plurality of optical components 16A and 16B adapted to redirect and distribute light from a plurality of lasers 12A and 12B to different sets of luminous pixels 18 of the pixelated luminous screen 14. It will, however, be understood that, in other embodiments, the optical components 16A and 16B may be adapted to redirect and distribute light from a plurality of lasers 12A and 12B to the same luminous pixels 18 of the pixelated luminous screen 14. By altering which laser light is redirected and distributed and/or to which luminous pixels 18 the light redirected/distributed, the light emitted from the pixelated luminous screen 14 may be altered and/or controlled according to predetermined requirements, for example.

Use of a heat sink with reflective properties has been described. However in cases where extra cooling is preferred, one may use transparent heat sink on top of the surface of the luminescent pixels where converted light exits the pixels. Such a transparent heat sink can have many forms such as a dome pyramided.

Also, although the embodiments of FIG. 14 have been described without any apertures in the heat sink for enabling light to pass therethrough, it is to be understood that, in alternative embodiments, the heat sink may comprise at least one aperture adapted to enable light to pass therethrough and be incident on the rear surface of one or more of the plurality of luminous pixels. For example, in other embodiments, the laser(s) and optical component(s) may be adapted to redirect and distribute light from the lasers to luminous pixels of the pixelated luminous screen by directing light through holes in the heatsink so that the light is incident on the rear (e.g. bottom) surface of the luminous pixels.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting system comprising: at least one laser to output light; a pixelated luminous screen to emit light when excited by incident light, wherein the laser and the pixelated luminous screen are fixed in position relative to one another; and at least one optical component to redirect light from the at least one laser to the pixelated luminous screen, wherein the pixelated luminous screen comprises: a plurality of luminous pixels arranged with separated side edges, each of the luminous pixels comprising luminous material; and a heat sink formed from thermally conductive material, the heat sink being positioned between the plurality of luminous pixels such that it contacts the separated side edges of the luminous pixels, wherein each of the plurality of luminous pixels comprises: a front light output surface to output light; and a rear surface opposite the front light output surface, wherein the heat sink at least partially covers the rear surface of each of the plurality of luminous pixels, and wherein the heat sink comprises a plurality of apertures to enable light to pass therethrough and be incident on the rear surface of each of the plurality of luminous pixels and, wherein an at least partially transparent layer at least partially covers the front light output surface of each of the plurality of luminous pixels.

2. The lighting system of claim 1, wherein the front light output surface of the plurality of luminous pixels is non-planar.

3. The lighting system of claim 1, wherein at least some of the side edges of the plurality of luminous pixels are tapered so that the front light output surface area of a luminous pixel is greater than the rear surface area.

4. The lighting system of claim 1, wherein the partially transparent layer is non-planar.

5. The lighting system of claim 1, wherein the at least partially transparent layer comprises an array of lenticular structures.

6. The lighting system of claim 1, wherein the at least partially transparent layer is formed from a material having a thermal conductivity higher than 2 $W \cdot m^{-1} \cdot K^{-1}$.

7. The lighting system of claim 1, wherein at least two of the plurality of luminous pixels comprise the same luminous material.

8. The lighting system of claim 1, wherein at least one of the plurality of luminous pixels further comprises an at least partially transparent non-luminous material.

9. The lighting system of claim 1, wherein at least one of the plurality of luminous pixels further comprises a reflective material.

10. The lighting system of claim 1, wherein the plurality of luminous pixels are of different shapes or are of different sizes.

11. The lighting system of claim 1, further comprising:
first and second lasers adapted to output first laser light and second laser light, respectively; and
a plurality of optical components adapted to redirect the first laser light and the second laser light to different sets of luminous pixels of the pixelated luminous screen.

12. The lighting system of claim 1 wherein the thermal conductivity of the thermally conductive material is higher than 10 $W \cdot m^{-1} \cdot K^{-1}$.

13. A method of manufacturing a pixelated luminous screen for a lighting system having at least one laser adapted to output light and at least one optical component adapted to redirect light from the at least one laser to the pixelated luminous screen, the method comprising: providing a plurality of luminous pixels arranged with separated side edges, wherein each of the plurality of luminous pixels comprises a front light output surface to output light, and a rear surface opposite the front light output surface, and luminous material, wherein the laser and luminous pixels are fixed in position relative to one another; forming a heat sink from thermally conductive material such that heat sink at least partially covers the rear surface of each of the plurality of luminous pixels and is positioned between the plurality of luminous pixels such that it contacts the adjacent side edges of the luminous pixels; and forming a plurality of apertures in the heat sink, to enable light to pass therethrough and be incident on the rear surface of each of the plurality of luminous pixels; and providing an at least partially transparent layer that at least partially covers the front light output surface of each of the plurality of luminous pixels.

14. The method of claim 13, wherein the front light output surface of the plurality of luminous pixels is non-planar.

15. The method of claim 13, wherein at least some of the side edges of the plurality of luminous pixels are tapered so that the front light output surface area of a luminous pixel is greater than the rear surface area.

16. The method of claim 13, wherein the partially transparent layer is non-planar.

17. The method of claim 13, wherein the at least partially transparent layer comprises an array of lenticular structures.

18. The method of claim 13, wherein the at least partially transparent layer is formed from a material having a thermal conductivity higher than 2 $W \cdot m-1 \cdot K-1$.

19. The method of claim 13, wherein at least two of the plurality of luminous pixels comprise the same luminous material.

20. The method of claim 13, wherein at least one of the plurality of luminous pixels further comprises an at least partially transparent non-luminous material.

* * * * *